UNITED STATES PATENT OFFICE.

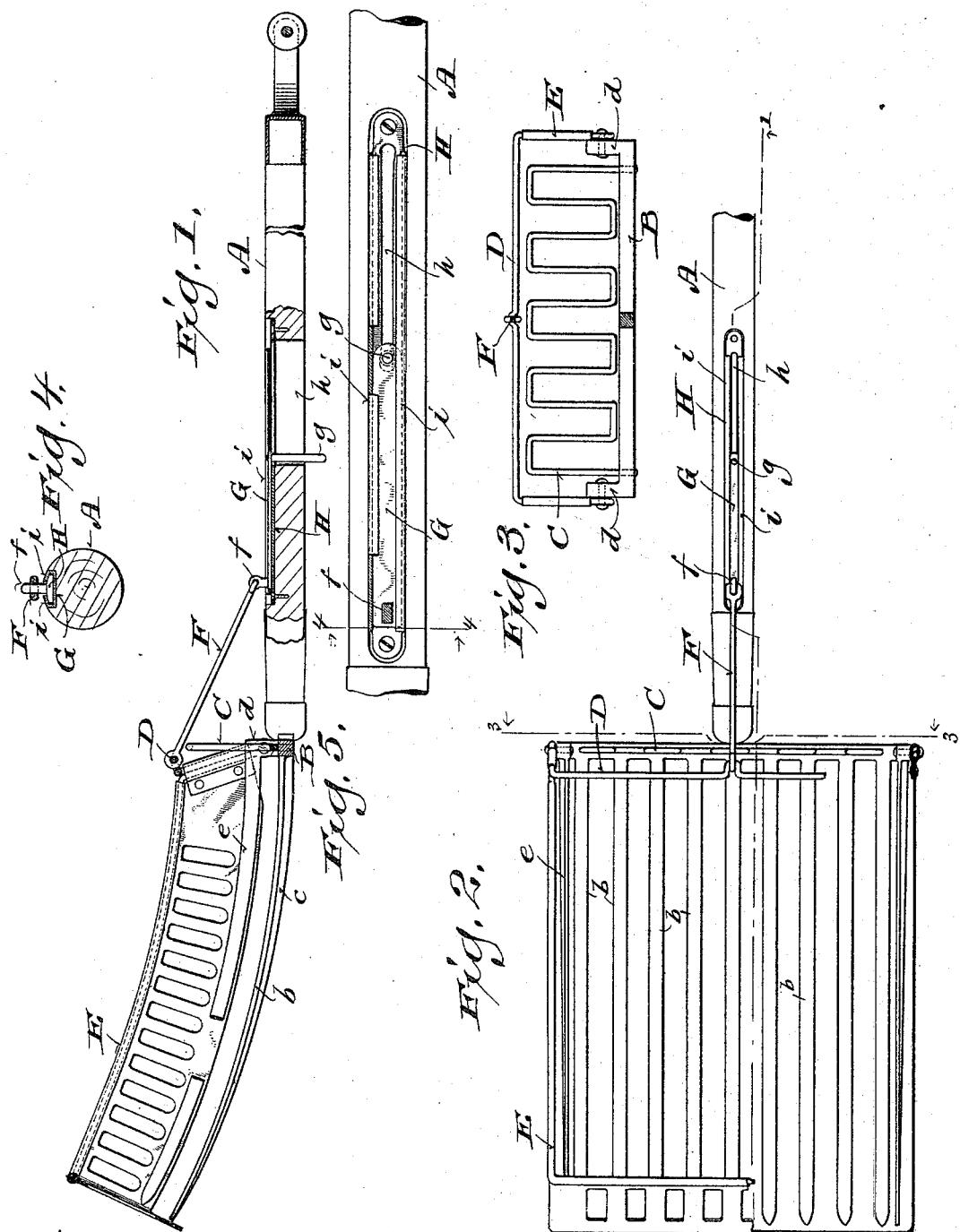

LARS FREDERICKSON, OF PEWAUKEE, WISCONSIN.

POTATO-DIGGER.

SPECIFICATION forming part of Letters Patent No. 572,885, dated December 8, 1896.

Application filed March 19, 1896. Serial No. 583,868. (No model.)

*To all whom it may concern:*

Be it known that I, LARS FREDERICKSON, a citizen of the United States, and a resident of Pewaukee, in the county of Waukesha and State of Wisconsin, have invented certain new and useful Improvements in Potato-Diggers; and I do hereby declare that the following is a full, clear, and exact description thereof.

My invention has for its object to facilitate digging of potatoes and removal of dirt from the same. Hence it consists in certain peculiarities of construction and combination of parts hereinafter set forth with reference to the accompanying drawings and subsequently claimed.

In the drawings, Figure 1 represents a potato-digger constructed according to my invention as it appears, partly in section, on line 1 1 of Fig. 2; Fig. 2, a plan view of the implement, partly broken away; Fig. 3, an elevation viewed on the plane indicated by line 3 3 in Fig. 2; Fig. 4, a transverse section taken on line 4 4 of Fig. 5; and Fig. 5, an enlarged plan view illustrating the handle of said implement and the guide thereon for a slide-plate, this guide being partly broken away.

Referring by letter to the drawings, A represents a wooden handle provided at its outer end with a yoke-like grip, the handle, as thus far described, being common in connection with spades, forks, and various other implements. Fast to the other end of the handle is a broad fork comprising a series of preferably flat tines $b$, extending from a transverse bar B, and the tines may be strengthened by longitudinal ribs $c$ on their under sides.

The bar B has upturned lugs $d$, and extended from these lugs, in the same direction as the tines $b$, are side guards $e$, the latter and said tines being preferably curved, as herein shown.

Supported on bar B intermediate of lugs $d$ is a rigid upwardly-extending transverse guard C, that may be made from a single wire bent to form a series of rectangular loops, as best illustrated in Fig. 3.

Pivotally connected to the upturned lugs $d$ of bar B is a bail D, constituting part of a three-sided frame E preferably made from stiffened sheet metal cut away at intervals to form a series of openings of such contour as may be found most desirable.

The frame D closes down outside the guards $e$ and beyond the points of the tines $b$, said guards serving to prevent the sides of said frame from being strained by the material caught on the fork.

A link F connects the pivotal frame-bail D with an eye $f$ on a plate G, arranged to slide on the handle A longitudinally of the same, and a grip-shank $g$ extends from the plate through a longitudinal slot $h$ in said handle.

As a matter of preference the wooden handle A is provided with a metal guide for the slide-plate G, the latter being also of metal, and the guide herein shown is a plate H, having angle-flanges $i$, that overlap said slide-plate. The guide-plate is also provided with a longitudinal slot that registers with the one in the handle, and said guide-plate being preferably mortised in said handle it is secured in place by screws or other suitable means.

In practice the implement above described is gripped by an operator so as to have one of his hands adjacent to the plate-shank $g$, extending through the longitudinal slot $h$ in the handle portion of said implement. The frame D being lifted by a rearward movement of plate G, in link connection therewith, the fork is pushed down into a hill of potatoes and then tilted to bring the material caught thereon toward the rear against the guard C, after which said frame is permitted to descend and thereby completely inclose said material. Now by lifting the fork and agitating the same the potatoes will be freed from dirt, the latter escaping between the fork-tines and through the apertures in the frame and back guard. This operation being accomplished, the frame is again lifted and the potatoes deposited alongside the hill from which they are taken.

Having now fully described my invention, what I claim as new, and desire to secure by Letters Patent, is—

1. A potato-digging implement comprising a fork of suitable dimensions provided with a handle, an upwardly-extending transverse guard in rigid connection with the rear portion of the fork, a frame in pivotal connection with said fork to close down outside the tines of same, and a slide-plate on the fork-handle in link connection with said frame.

2. A potato-digging implement comprising a fork of suitable dimensions provided with a handle, an upwardly-extending transverse guard in rigid connection with the rear portion of the fork, permanent side guards on said fork, a frame in pivotal connection with the aforesaid fork to close down outside the side guards and tine-points thereof, and a reciprocative plate on the fork-handle in link connection with the frame.

3. A potato-digging implement comprising a fork of suitable dimensions provided with a handle having a longitudinal slot, a frame in pivotal connection with the fork to close down outside the tines thereof, a reciprocative plate on the fork-handle having a grip-shank engaging said slot, and a link connecting the plate with said frame.

4. A potato-digging implement comprising a fork of suitable dimensions provided with a handle having a longitudinal slot, a frame in pivotal connection with the fork to close down outside the same, a guide-plate fast on the fork-handle provided with a slot in register with the one aforesaid, another plate reciprocative in the guide-plate, a grip-shank extending from the reciprocative plate through said slots, and a link connecting said reciprocative plate with the aforesaid frame.

5. A potato-digging implement comprising a fork of suitable dimensions provided with a longitudinally-slotted handle, upturned rear lugs and side guards extending from the lugs in the same direction as the tines; a screen-guard on the fork at the rear thereof, a screen-frame pivoted to said lugs to close down outside the tine-points and side guards, and a reciprocative plate on the fork-handle in link connection with the screen-frame.

In testimony that I claim the foregoing I have hereunto set my hand, at Pewaukee, in the county of Waukesha and State of Wisconsin, in the presence of two witnesses.

LARS FREDERICKSON.

Witnesses:
CHAS. L. ALLEN,
W. H. THOMAS.